No. 615,857. Patented Dec. 13, 1898.
S. R. KIRBY.
GREAT CIRCLE COURSE INDICATOR.
(Application filed June 3, 1898.)
(No Model.)

WITNESSES.
Edward Thorpe
H. L. Reynolds.

INVENTOR
S. R. Kirby
By
ATTORNEYS.

UNITED STATES PATENT OFFICE.

STEPHEN R. KIRBY, OF NEW YORK, N. Y.

GREAT-CIRCLE COURSE-INDICATOR.

SPECIFICATION forming part of Letters Patent No. 615,857, dated December 13, 1898.

Application filed June 3, 1898. Serial No. 682,484. (No model.)

*To all whom it may concern:*

Be it known that I, STEPHEN R. KIRBY, of the city of New York, borough of Manhattan, in the county of New York and State of New York, have invented a new and Improved Great-Circle Course-Indicator, of which the following is a full, clear, and exact description.

My invention relates to a device intended to assist navigators in determining the direction and location of a great circle between any two points in order that they may steer their ship over the course making the shortest distance between said points.

My invention comprises the novel features hereinafter shown and described.

Reference is to be had to the accompanying drawings, forming a part of this specification, in which similar characters of reference indicate corresponding parts in both figures.

Figure 1:
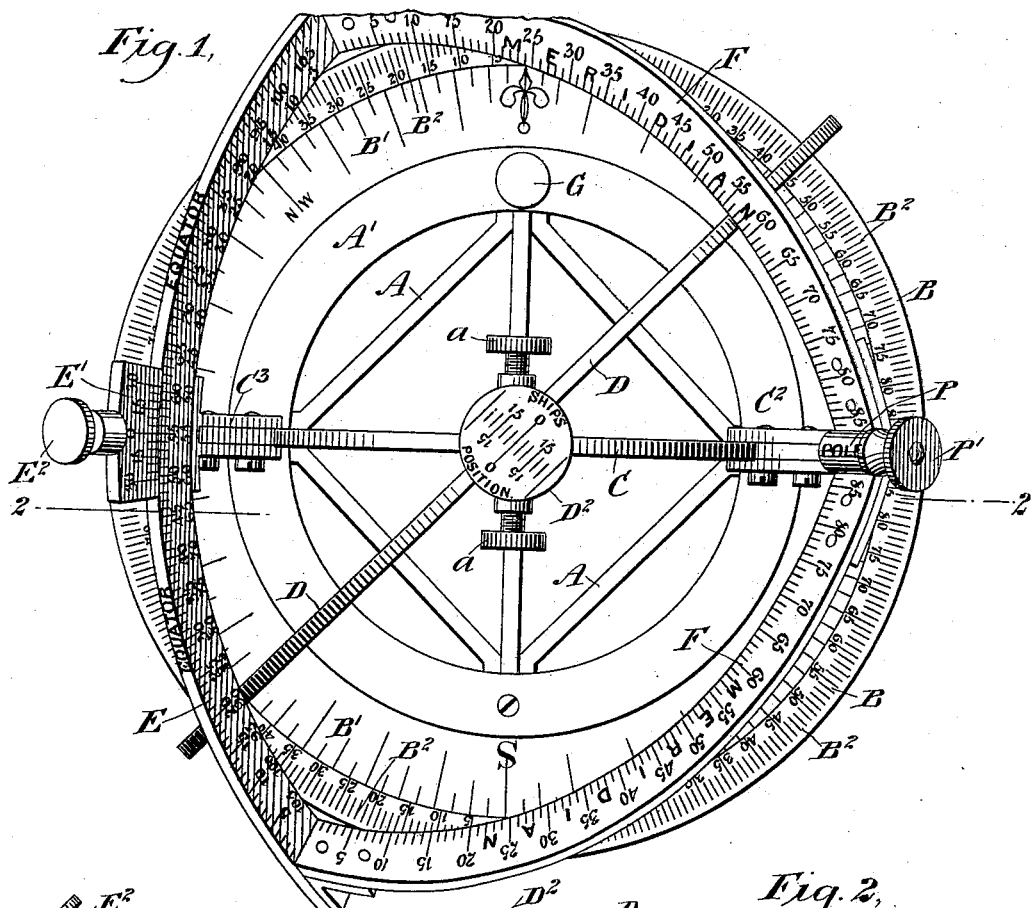
Figure 2:
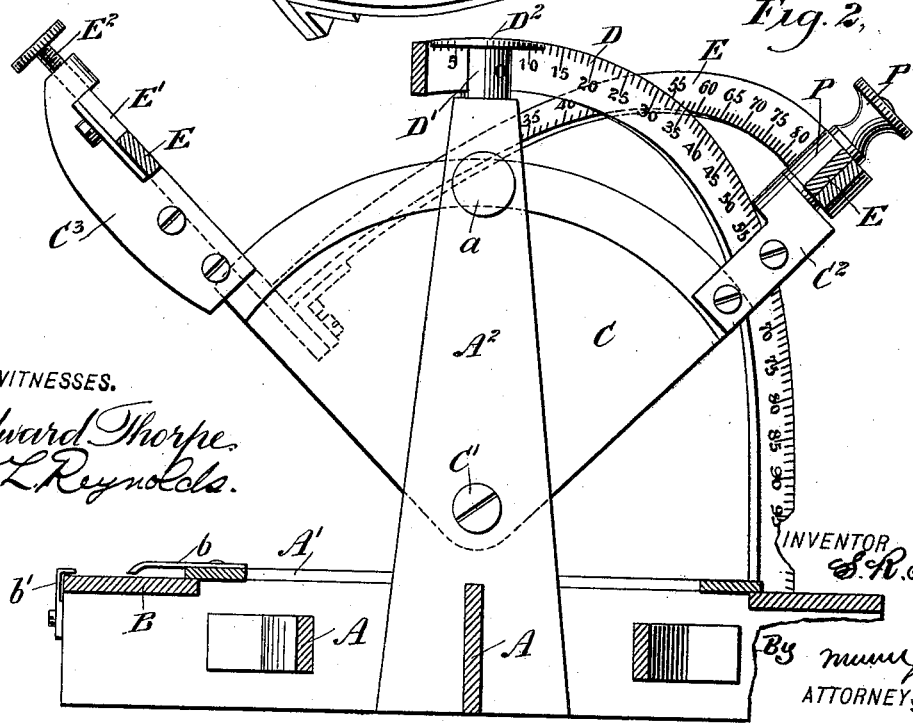

Figure 1 is a top plan view of my device, and Fig. 2 is a sectional elevation taken upon the line 2 2 of Fig. 1.

It is a universally-known fact among navigators that an arc of a great circle is the shortest distance between two points and that when possible to do so ships are sailed upon the arcs of great circles. The direction and location of the great circles have heretofore been determined principally by calculations which involve complicated figuring or by graphical methods which necessitate special charts which at their best are but approximations to accuracy.

The object of my invention is to produce a device which shall be accurate and which may be manipulated by any person to quickly determine the direction of a great circle at any point. Being easily operated, they will be used to determine the direction of a circle at very short intervals, and thus enable the navigator to sail very accurately upon the great circle.

My device comprises an equatorial arc which is connected with meridian-arcs, the latter being connected to a polar pivot, so that the meridians may be swung to any point desired. The polar pivot is also mounted upon a meridian-plane which is pivoted at a point representing the center of the earth, so that the pole may be swung in this meridian-plane to adjust the device for any latitude. Passing through a central point which represents the ship's position is a great-circle arc which has a pivot located in the meridian-plane and extending toward the center upon which said plane is pivoted—that is, toward the center of the earth.

A suitable framework A is provided, upon which is mounted a standard $A^2$. In this standard is pivoted a plate C by a pivot $C'$. This plate represents a meridian-plane, or a plane which passes through the pole and the center of the earth. The plate C is preferably made to extend over about ninety degrees, or the quarter of a circle, the pivot $C'$ being near the corner of the plate. This pivot $C'$ represents the center of the earth. Upon one side of the plate C is an arm $C^2$, which supports the polar pivot P. This pivot is in line with the central pivot $C'$ and represents a pole of the earth. Two meridian-arcs F F extend from the polar pivot and at their opposite ends are connected with the ends of an equatorial arc E. The meridian-arcs of course extend through ninety degrees of a circle and have a scale marked upon their face, said scale being laid off in degrees. The equatorial arc may be of any suitable length, but is preferably made, as shown in the drawings, to extend through an arc of about one hundred and ten degrees, said arc being sufficient to cover the distance between any two points between which it is ordinarily possible to lay out a sailing-course upon an arc of a great circle. This equatorial arc slides through a groove formed in an extension or arm $C^3$, carried upon the side of the meridian-plane C opposite that carrying the pole. The surface of this equatorial arc toward the pole is exactly ninety degrees from said pole. This arc is laid out in a scale of degrees preferably having double numbering, the numbering beginning from opposite ends. Upon the arm $C^3$ is secured a plate $E'$, which has a vernier-scale. By this means the equatorial arc may be set to five minutes.

Upon the upper end of the standard $A^2$ is a central pivot $D'$, which is in line with the pivot $C'$ and supports the great-circle arc D. The center line or axis of this pivot represents the ship's position at any time. The upper end of this pivot is provided with a button or circular plate D², which has a vernier thereon, so that the meridian-arcs may be more accurately set. In setting the device the great-circle arc should first be placed at right angles to the meridian-plane. The reading of the vernier is to five minutes. Clamping-screws E² secure the equatorial arc in any fixed position, and clamping-screws $a$ secure the meridian-plane in any fixed position.

The base of the device is provided with a ring A', and outside of this is a ring B, which is adjustable, being rotatable about the center of the device. This ring B is provided with a scale or preferably with two scales, one laid out to degrees and the other with the points of the compass. As shown in the drawings, these two scales are used, the outer scale B² being the one which represents with degrees and the inner scale B' being the one which is laid out as a compass. The clamping-screw G serves to lock the movable ring B in any position to which it has been adjusted. The fixed ring A' is provided with a pointer $b$, by which the movable ring B is adjusted. A second pointer $b'$ may be attached to the frame and extend over the outer edge of the ring, one pointer being intended for use in reading the degrees and the other in reading the compass-points. The great-circle arc is also laid out in degrees, as indicated in the outer reading, in this case to one hundred and ten degrees on each side of the ship's position. This is used in determining the length of the course sailed.

My device is used as follows: The latitude of the ship being known the meridian-plane is set to a position corresponding with this latitude. This is done in the following manner: The equatorial arc is loosened, so that one of the meridian-arcs may be swung so that its face corresponds with the meridian-plane—that is, until its edge is in line with the zero position of the vernier E². The screw $a$, which clamps the meridian-plane in position, is loosened and the plane adjusted so that the reading upon the meridian-arc corresponds with the latitude of the ship. The meridian-plane is then clamped in this position. The equatorial arc is then moved toward either the east or west, as the case may be, until its reading corresponds with the difference in longitude between the port where the ship is and the port toward which the ship is sailing. This corresponds with the port of sailing and port of destination or the beginning and end of the voyage. From observations taken during the voyage the latitude and longitude are to be determined and this data used in setting the device. The meridian-plane having been set for the latitude of the ship and the equatorial arc having been set to represent the difference in longitude between the two points the great-circle arc is then turned until the edge thereof, which is provided with the scale, is exactly in line with the reading upon the meridian-arc corresponding with the latitude of the port of destination. This arc then corresponds with a great circle passing through the latitude and longitude of the ship and the latitude and longitude of the port of destination. The direction of the course at that particular point will then be obtained by reading from the scale upon the circle B. If, as is usually the case, the compass does not at that particular point point directly north, the variation of the compass is allowed for by either adding or subtracting the proper number of degrees from the reading given or may be read direct from the device by setting the ring B to the right or left an amount corresponding with the variation of the compass. By setting the ring B in this manner the reading may be taken directly from the device. As an example of this use we will suppose that the sailing-port is in latitude of 40° 30' and the port of destination in latitude 42° and the difference in longitude is 62° and toward the west. Setting the meridian-plane to correspond with the latitude 40° 30' and the equatorial arc to correspond with the difference of longitude of 62°, we then swing the great-circle arc until it corresponds with the reading 42° on the meridian-arc. We then find the compass-reading to be north 66° 30' west. This is without allowing for any variation in compass, which would have to be added or subtracted, as the case may be. The different latitudes through which this circle will take the ship may be found by freeing the equatorial circle and swinging the meridian-arc over the great-circle arc. The difference in reading upon the meridian-arc will indicate the latitudes through which the ship will pass in its course.

It will be seen that this device is accurate and is one which may be quickly operated and understood by any ordinary navigator. Its use will enable a navigator to keep his ship accurately upon a great circle, and thus result in much shortening of sailing-courses and consequent saving of time and fuel.

The distance between the two ports upon the arc of a great circle may be read from the great-circle arc. When the instrument has been set to read the course the number of degrees upon the great-circle arc indicated by the intersection of the meridian-arc therewith gives the degrees upon the great circle and the knots may be determined by multiplying this by sixty.

Having thus fully described my invention, I claim as new and desire to secure by Letters Patent—

1. A great-circle course-indicator, comprising an equatorial arc and meridian-arcs connected to the equatorial arc and to each other at the pole, said arcs being mounted on a polar pivot and the polar pivot having a central pivot whereby it may be swung in a meridian-plane, and a great-circle arc having a radial pivot in said meridian-plane, substantially as described.

2. A great-circle course-indicator, comprising an equatorial arc and meridian-arcs connected to the equatorial arc and to each other at the pole, said arcs being mounted on a polar pivot and the polar pivot having a central pivot whereby it may be swung in a meridian-plane, a great-circle arc having a radial pivot in said meridian-plane, and means for clamping the polar and central pivots, substantially as described.

3. A great-circle course-indicator, comprising an equatorial arc and meridian-arcs connected to the equatorial arc and to each other at the pole, said arcs being mounted on a polar pivot and the polar pivot having a central pivot whereby it may swing in a meridian-plane, a great-circle arc having a radial pivot in said meridian-plane, and a compass or course ring in a plane perpendicular to the pivot of the great-circle arc and adjacent the ends of said arc, substantially as described.

4. A great-circle course-indicator, comprising an equatorial arc and meridian-arcs connected to the equatorial arc and to each other at the pole, said arcs being mounted on a polar pivot and the polar pivot having a central pivot whereby it may be swung in a meridian-plane, and a great-circle arc having a radial pivot in said meridian-plane, said arcs having a scale of degrees thereon and verniers coöperating therewith, substantially as described.

5. A great-circle course-indicator, comprising an equatorial arc and meridian-arcs connected to the equatorial arc and to each other at the pole, said arcs being mounted on a polar pivot and the polar pivot having a central pivot whereby it may be swung in a meridian-plane, a great-circle arc having a radial pivot in said meridian-plane, and swinging just inside the equatorial and meridian arcs, the meridian-arcs having a scale of degrees laid out adjacent the edge next the great-circle arc, substantially as described.

6. A great-circle course-indicator, comprising an equatorial arc and meridian-arcs connected to the equatorial arc and to each other at the pole, said arcs being mounted on a polar pivot and the polar pivot having a central pivot whereby it may swing in a meridian-plane, a great-circle arc having a radial pivot in said meridian-plane, and a compass or course ring in a plane perpendicular to the pivot of the great-circle arc and adjacent the ends of said arc, said course-ring being adjustable for compass variation, substantially as described.

STEPHEN R. KIRBY.

Witnesses:
EVERARD BOLTON MARSHALL,
H. L. REYNOLDS.